(12) United States Patent
Yu

(10) Patent No.: US 9,147,384 B1
(45) Date of Patent: Sep. 29, 2015

(54) MUSICAL INSTRUMENT STAND

(71) Applicant: Tsung-Yao Yu, Taichung (TW)

(72) Inventor: Tsung-Yao Yu, Taichung (TW)

( * ) Notice: Subject to any disclaimer, the term of this patent is extended or adjusted under 35 U.S.C. 154(b) by 0 days.

(21) Appl. No.: 14/619,165

(22) Filed: Feb. 11, 2015

(30) Foreign Application Priority Data

Oct. 1, 2014 (TW) .............................. 103217506 U

(51) Int. Cl.
*G10G 5/00* (2006.01)
*F16M 11/00* (2006.01)

(52) U.S. Cl.
CPC . *G10G 5/00* (2013.01); *F16M 11/00* (2013.01)

(58) Field of Classification Search
CPC ....... G10D 13/026; G10G 5/005; G10G 5/00; Y10T 29/49826; Y10T 403/32467; F16M 13/00; G10H 1/32; G10H 2230/275; G10H 1/0008; G10H 2220/011; G10H 2220/126

USPC ..................... 84/327, 329, 453, 421
See application file for complete search history.

(56) References Cited

U.S. PATENT DOCUMENTS 4,304,166 A * 12/1981 Stefano et al. .............. 84/385 A

* cited by examiner

*Primary Examiner* — Kimberly Lockett
(74) *Attorney, Agent, or Firm* — Alan D. Kamrath; Kamrath IP Lawfirm, P.A.

(57) ABSTRACT

A musical instrument stand includes a base, a resting member, and two support units. The base includes two elastic units and two slideways. Each of the slideways has a folding recess and an expanding recess. Each of the elastic units includes two elastic strips. Each of the support units includes a pivot rod which has two opposite locking ends and a slide. The locking ends press the elastic strips, and the pivot rod is retained on the base by an elastic restoring action of the elastic strips. The slide slides reciprocally in one of the slideways and is detachably positioned in the folding recess and the expanding recess, so that each of the support units is positioned at a folded position and an expanded position.

9 Claims, 14 Drawing Sheets

MUSICAL INSTRUMENT STAND

BACKGROUND OF THE INVENTION

1. Field of the Invention

The present invention relates to a stand and, more particularly, to a musical instrument stand.

2. Description of the Related Art

A conventional musical instrument stand comprises a base, a resting member pivotally connected with the base, and two support members each pivotally connected with the base. The resting member and the support members are rotated relative to the base between a folded position where the resting member and the support members extend upward in an inclined manner to support a musical instrument and an expanded position where the resting member and the support members are rotated inward and folded to reduce the whole volume of the musical instrument stand to facilitate a user storing and carrying the musical instrument stand. However, when the resting member and the support members are disposed at the folded position or the expanded position, the resting member and the support members are not positioned exactly.

BRIEF SUMMARY OF THE INVENTION

The primary objective of the present invention is to provide a musical instrument stand that is assembled quickly, is operated easily and conveniently, is manufactured easily, is rotated smoothly, and is positioned exactly.

In accordance with the present invention, there is provided a musical instrument stand comprising a base, a resting member, and two support units. The base defines a central hole. The base includes two elastic units provided on two opposite sides of the central hole, and two slideways corresponding to the elastic units respectively. Each of the slideways has a wall formed with a folding recess and an expanding recess, and the expanding recess is disposed between the central hole and the folding recess. Each of the elastic units includes two spaced elastic strips. The resting member has a pivot end portion pivotally connected with the base and located adjacent to a rear side of the central hole, and has a free end that is spaced from and rotatable upward and downward relative to the pivot end portion. The support units are pivotally connected with the base and correspond to the elastic units respectively. Each of the support units includes a pivot rod. The pivot rod of each of the support units has two opposite locking ends and a slide. The locking ends of the pivot rod of each of the support units respectively press the elastic strips of one of the elastic units, and the pivot rod of each of the support units is retained on the base by an elastic restoring action of the elastic strips of one of the elastic units. The slide of the pivot rod of each of the support units slides reciprocally in one of the slideways of the base and is detachably positioned in the folding recess and the expanding recess of one of the slideways, and each of the support units is moved relative to the base and is positioned at a folded position and an expanded position.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
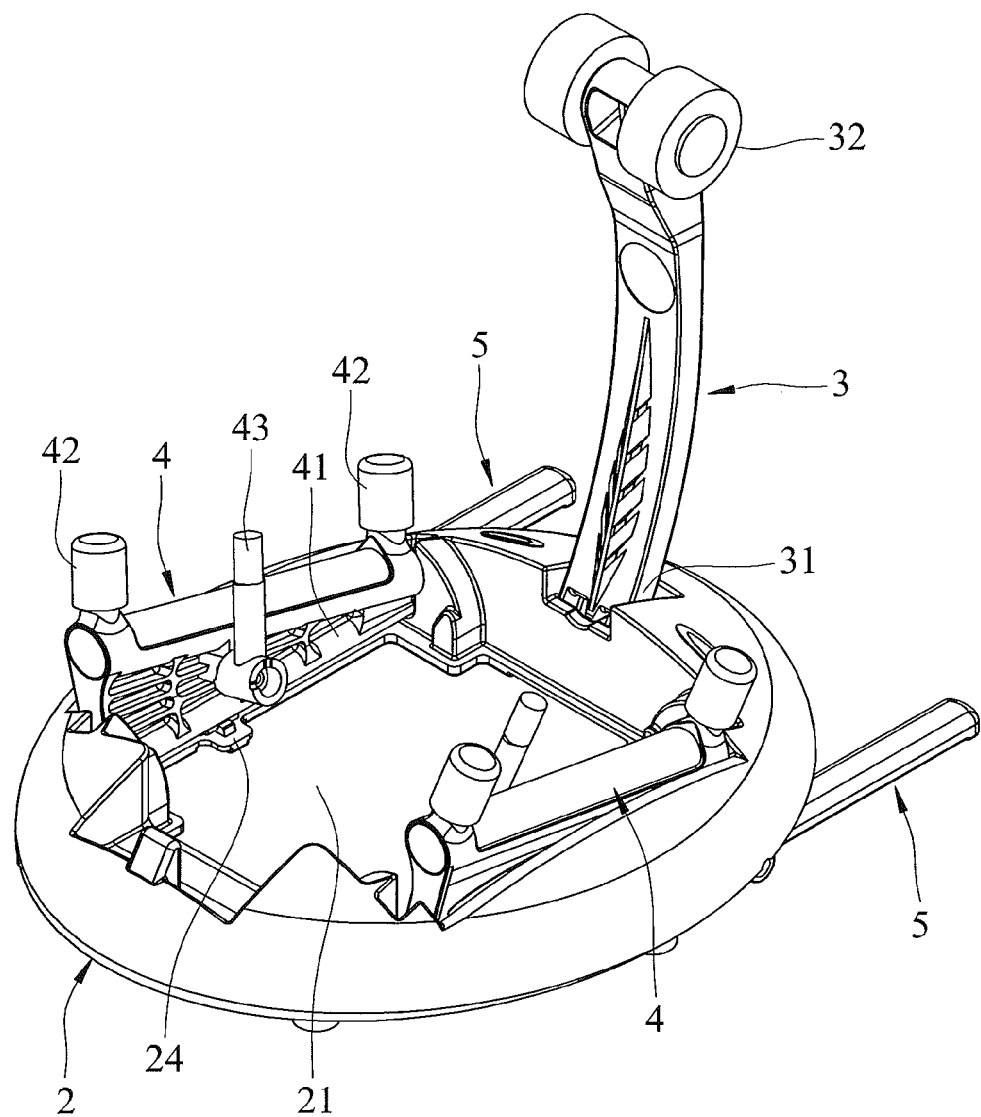
FIG. 1 is a perspective view of a musical instrument stand in accordance with the preferred embodiment of the present invention.

Referring to the drawings and initially to FIGS. 1-4, a musical instrument stand in accordance with the preferred embodiment of the present invention comprises a base 2, a resting member 3, two support units 4, and two supporting bars 5.

The base 2 defines a central hole 21. The base 2 includes an elastic positioning plate 22 provided on a rear side of the central hole 21, two elastic units 23 provided on two opposite sides of the central hole 21, and two elastic pieces 24 corresponding to the elastic units 23 respectively.

Figure 4:
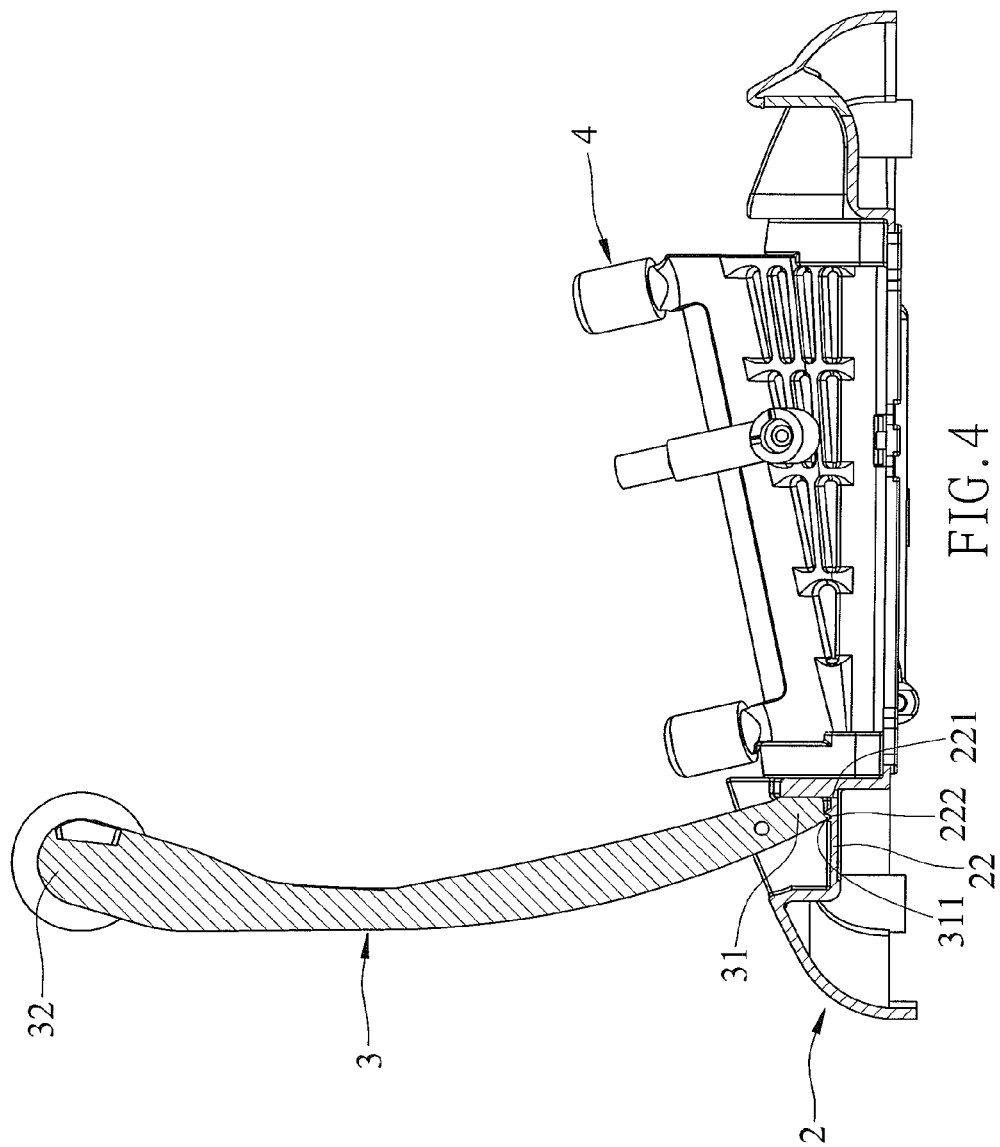
FIG. 4 is a cross-sectional view of the musical instrument stand taken along line IV-IV as shown in FIG. 2.

The elastic positioning plate 22 protrudes and extends horizontally toward the central hole 21 and has a free end 221 as shown in FIG. 4. The elastic positioning plate 22 has a positioning groove 222 formed in an upper surface thereof.

Figure 5:
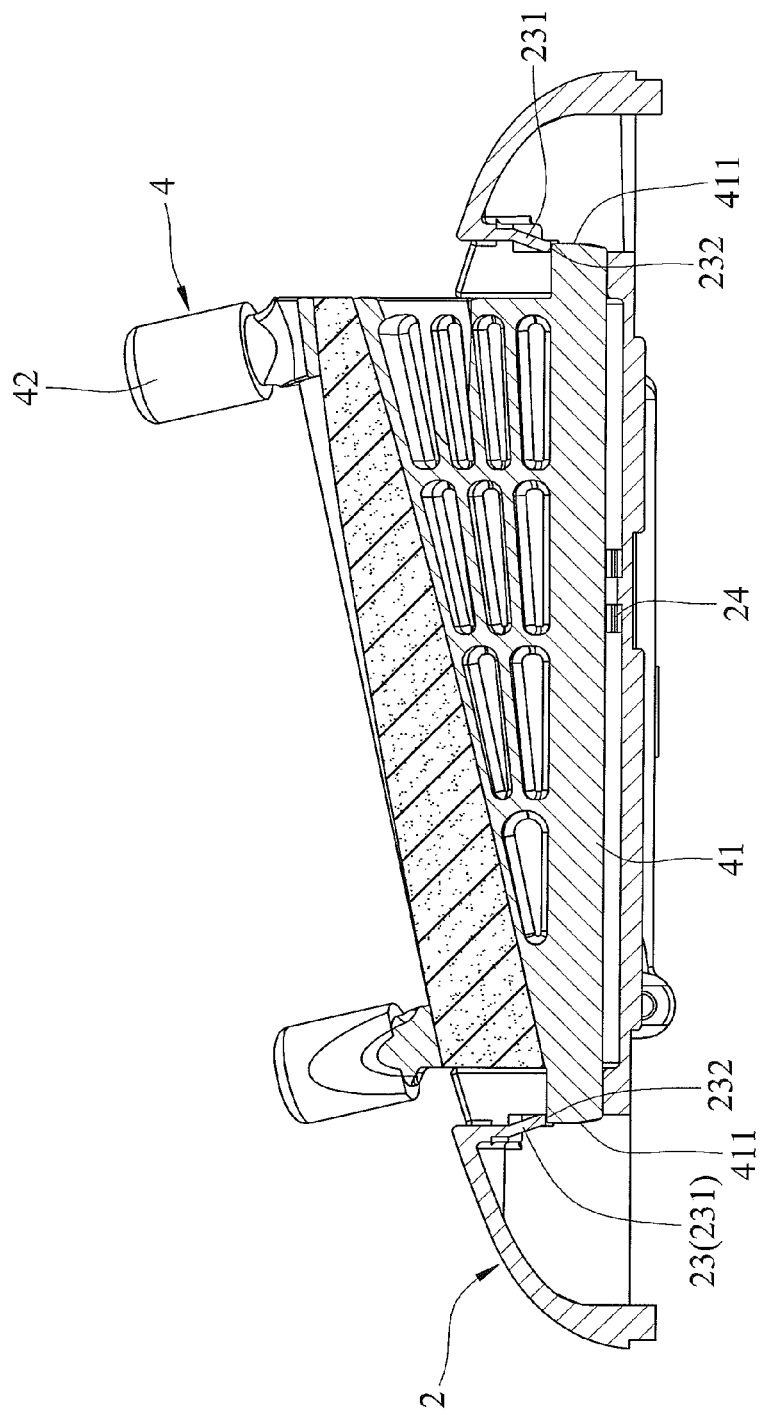
FIG. 5 is a cross-sectional view of the musical instrument stand taken along line V-V as shown in FIG. 2.
Figure 6:
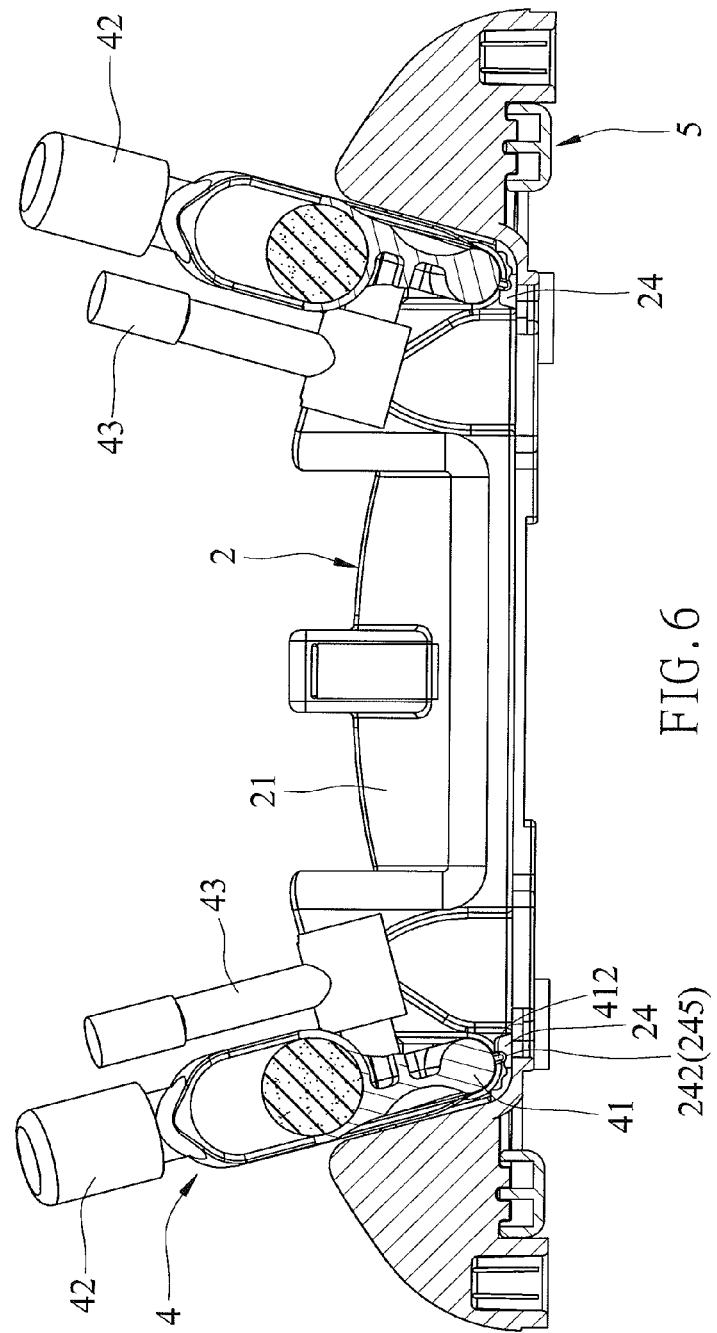
FIG. 6 is a cross-sectional view of the musical instrument stand taken along line VI-VI as shown in FIG. 2.
Figure 7:
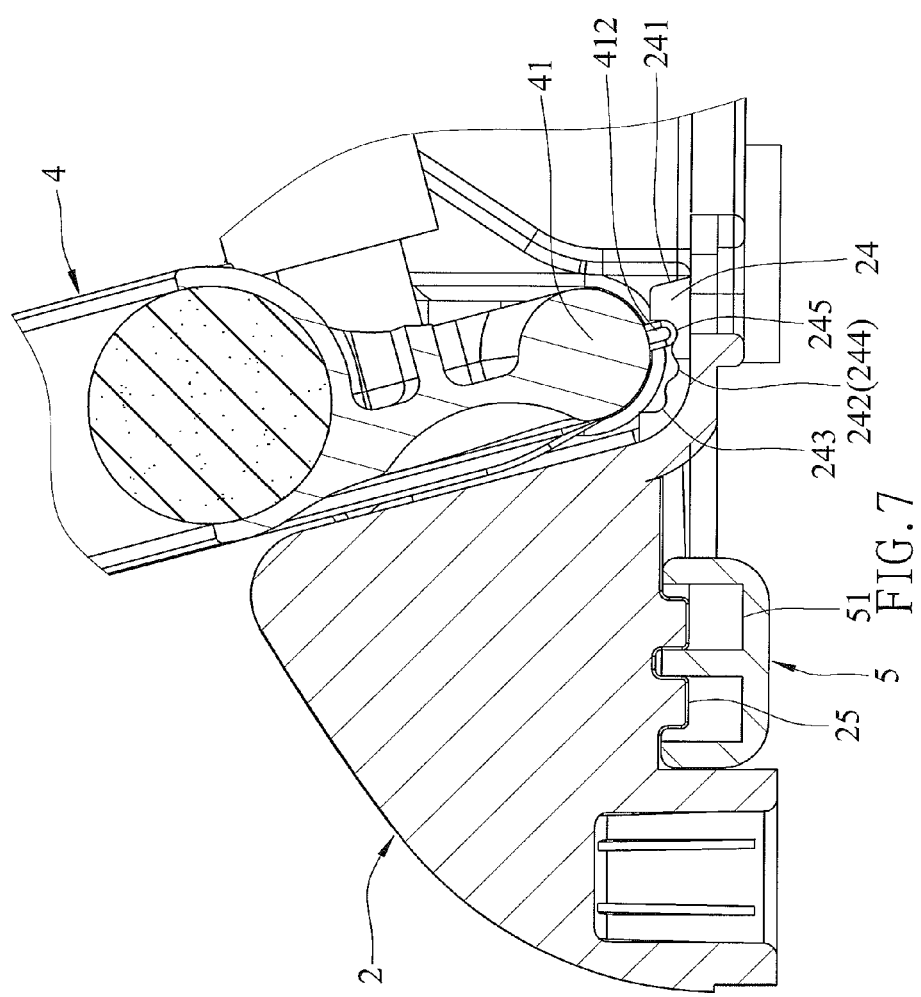
FIG. 7 is a locally enlarged view of the musical instrument stand as shown in FIG. 6.

Referring to FIGS. 5-7, each of the elastic units 23 includes two spaced elastic strips 231 extending downward toward each other in an oblique manner. Each of the elastic units 23 has a free end 232.

Each of the elastic pieces 24 is arranged between the elastic strips 231 of one of the elastic units 23 and protrudes and extends horizontally toward the central hole 21. Each of the elastic pieces 24 has a free end 241 and has a slideway 242 formed in an upper surface thereof. The slideway 242 of each of the elastic pieces 24 has a bottom wall formed with a folding recess 243, a mediate recess 244 and an expanding recess 245, wherein the expanding recess 245 is disposed between the central hole 21 and the mediate recess 244, and the mediate recess 244 is disposed between the expanding recess 245 and the folding recess 243.

Figure 8:
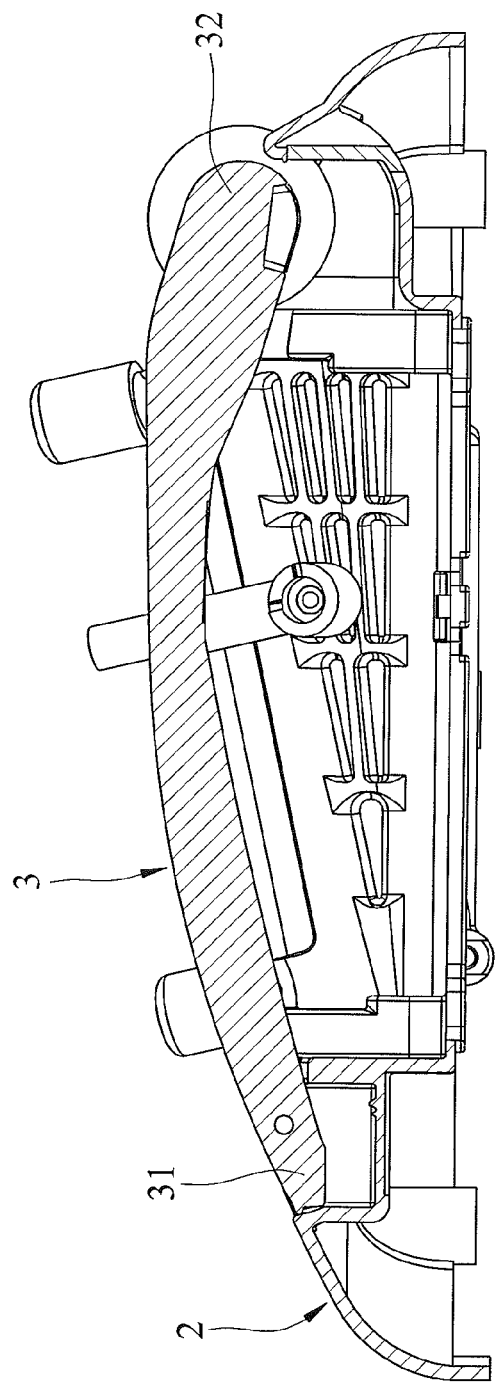
FIG. 8 is a schematic folded view of the musical instrument stand as shown in FIG. 4.

Referring to FIG. 4, the resting member 3 has a pivot end portion 31 pivotally connected with the base 2 and corresponding to the elastic positioning plate 22 and has a free end 32 that is spaced from and rotatable upward and downward relative to the pivot end portion 31. The pivot end portion 31 of the resting member 3 has a positioning protrusion 311 that presses the elastic positioning plate 22 by pivot of the pivot end portion 31 and is positioned in the positioning groove 222 by an elastic restoring action of the elastic positioning plate 22. At this time, the resting member 3 extends upward and is positioned at an upright state so that a musical instrument 6 (see FIG. 12) can rest on the resting member 3. When the resting member 3 is pivoted downward from the position as shown in FIG. 4 to the position as shown in FIG. 8, the free end 32 of the resting member 3 is snapped onto and positioned on the base 2 so that the resting member 3 is disposed at a folded state to reduce the whole volume of the musical instrument stand, thereby facilitating the user storing the musical instrument stand when not in use.

Figure 2:
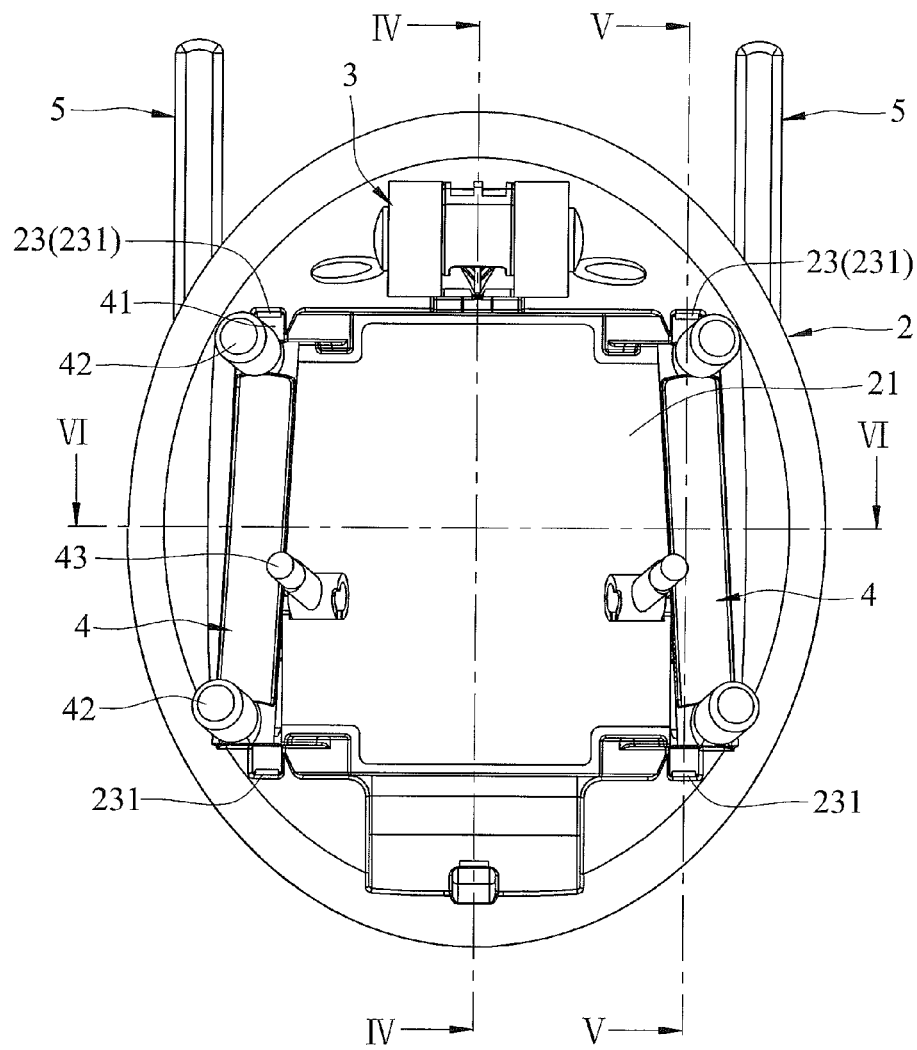
FIG. 2 is a top view of the musical instrument stand as shown in FIG. 1.

Referring to FIG. 2, the support units 4 are pivotally connected with the base 2 and correspond to the elastic units 23 respectively. Each of the support units 4 includes a pivot rod 41, two fixing blocks 42, and a rotary block 43.

Figure 9:
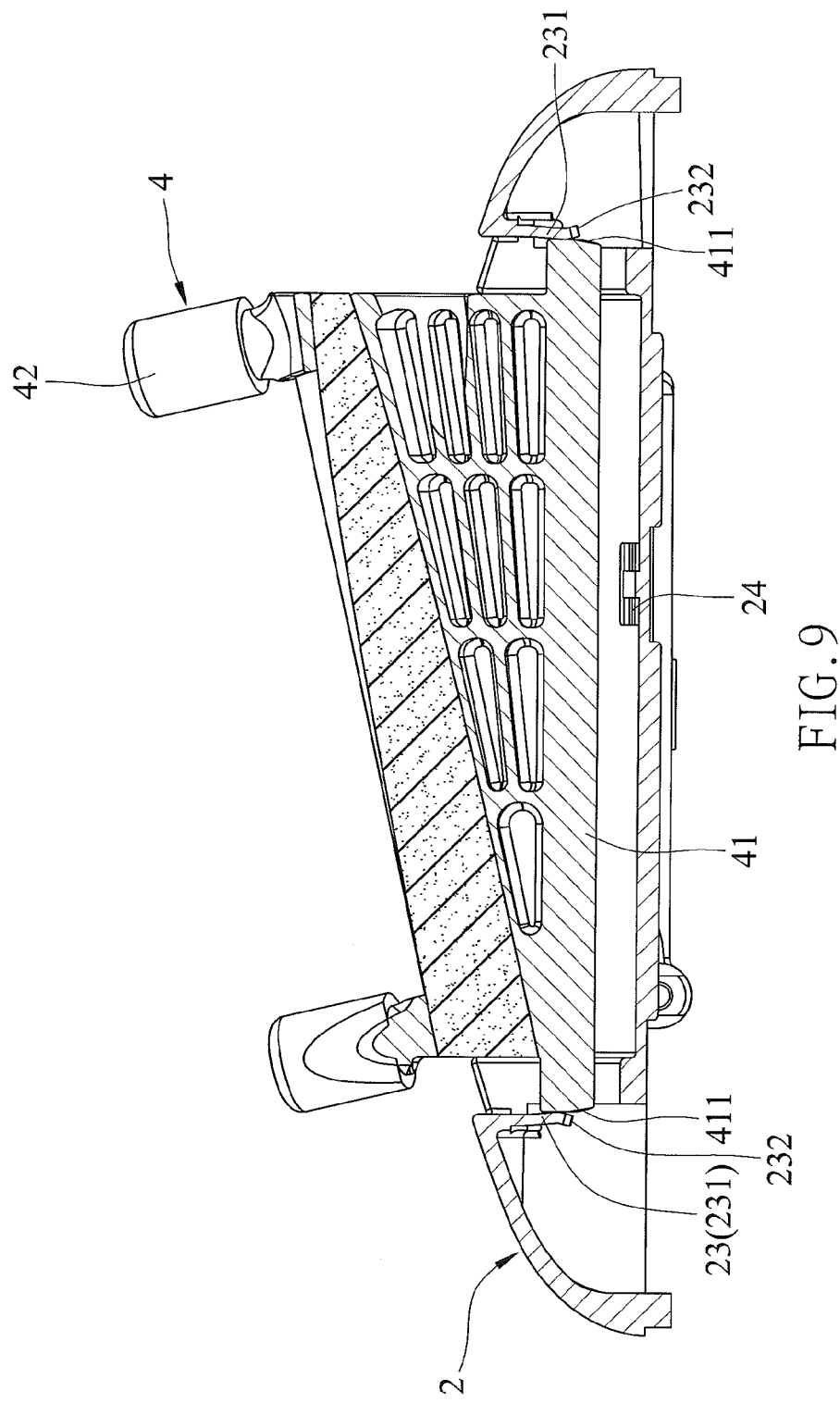
FIG. 9 is a schematic operational view of the musical instrument stand as shown in FIG. 5.

Referring to FIGS. 5 and 9, the pivot rod 41 of each of the support units 4 has two opposite locking ends 411 and a slide 412 (see FIG. 6) located between the locking ends 411. The locking ends 411 of the pivot rod 41 of each of the support units 4 respectively press the elastic strips 231 of one of the elastic units 23, so that the pivot rod 41 of each of the support units 4 is retained on the base 2 by an elastic restoring action of the elastic strips 231 of one of the elastic units 23.

Referring to FIG. 7, when the pivot rod 41 of each of the support units 4 is pivoted, the slide 412 slides reciprocally in the slideway 242 of one of the elastic pieces 24 of the base 2 and presses one of the elastic pieces 24 during the sliding process. Thus, the slide 412 of the pivot rod 41 of each of the support units 4 is subjected to an elastic restoring action of one of the elastic pieces 24 and is detachably positioned in the folding recess 243, the mediate recess 244 and the expanding recess 245 of the slideway 242 of one of the elastic pieces 24, so that each of the support units 4 is moved relative to the base 2 and is selectively positioned at a folded position (corresponding to folding recess 243) as shown in FIG. 10, an intermediate position (corresponding to the mediate recess 244) as shown in FIG. 11, and an expanded position (corresponding to the expanding recess 245) as shown in FIG. 6.

Figure 10:
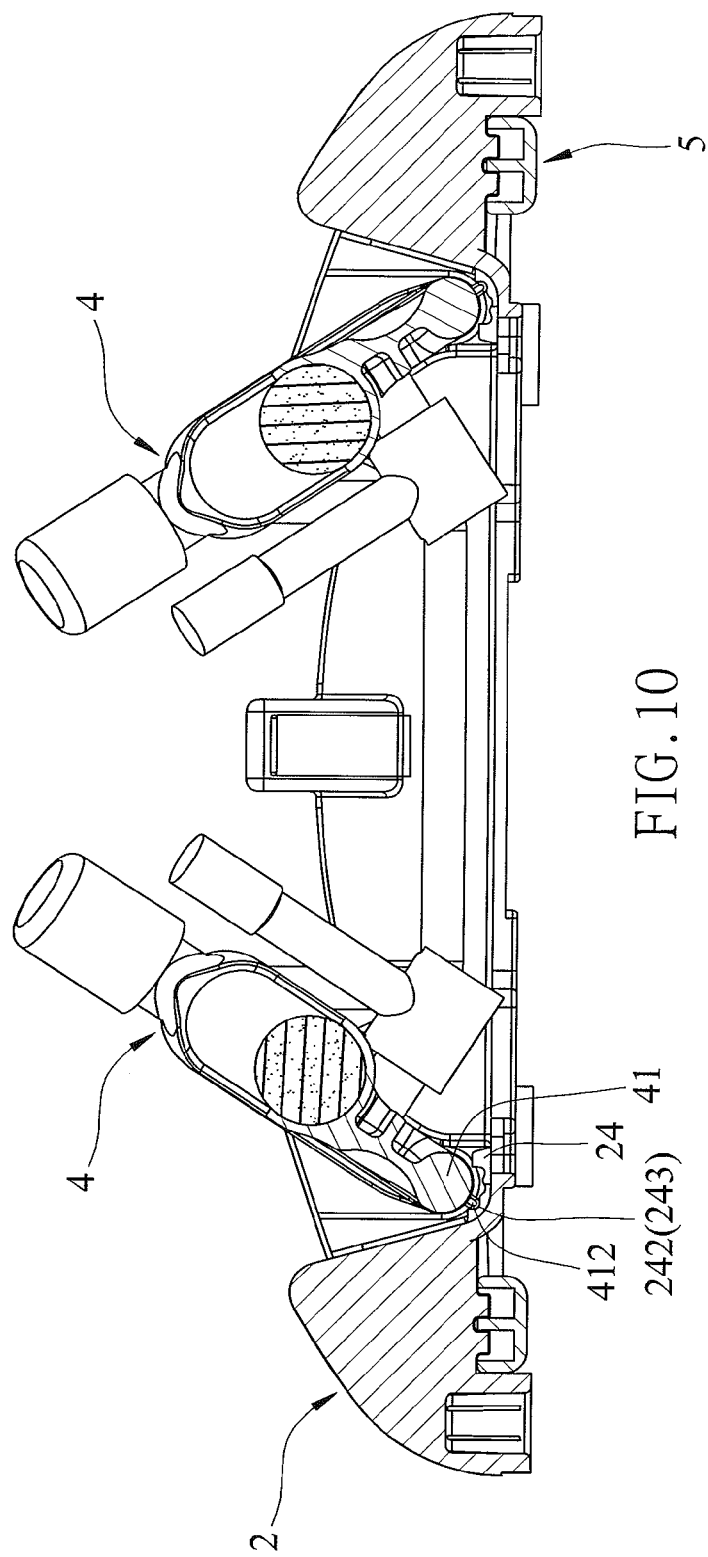
FIG. 10 is a schematic operational view of the musical instrument stand as shown in FIG. 6.
Figure 11:
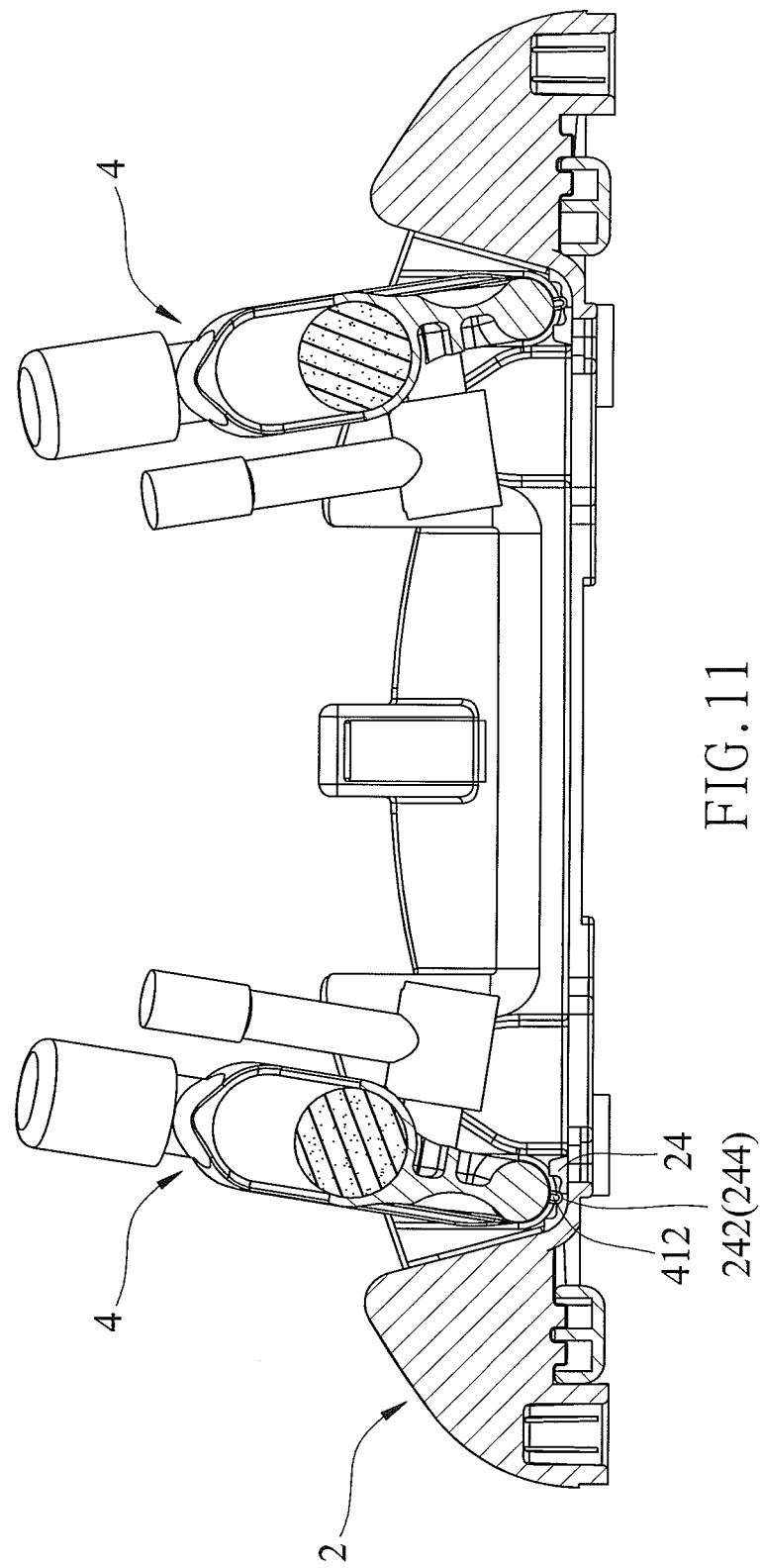
FIG. 11 is another schematic operational view of the musical instrument stand as shown in FIG. 6.

Referring to FIGS. 6, 10 and 11, each of the fixing blocks 42 of each of the support units 4 extends in a direction the same as that of the pivot rod 41 and extends radially and outward. In addition, when each of the support units 4 is respectively located at the folded position, the intermediate position, and the expanded position, each of the fixing blocks 42 of each of the support units 4 is respectively inclined and directed toward the central hole 21, is inclined and extending upward, and is inclined and spaced from the central hole 21.

Figure 12:
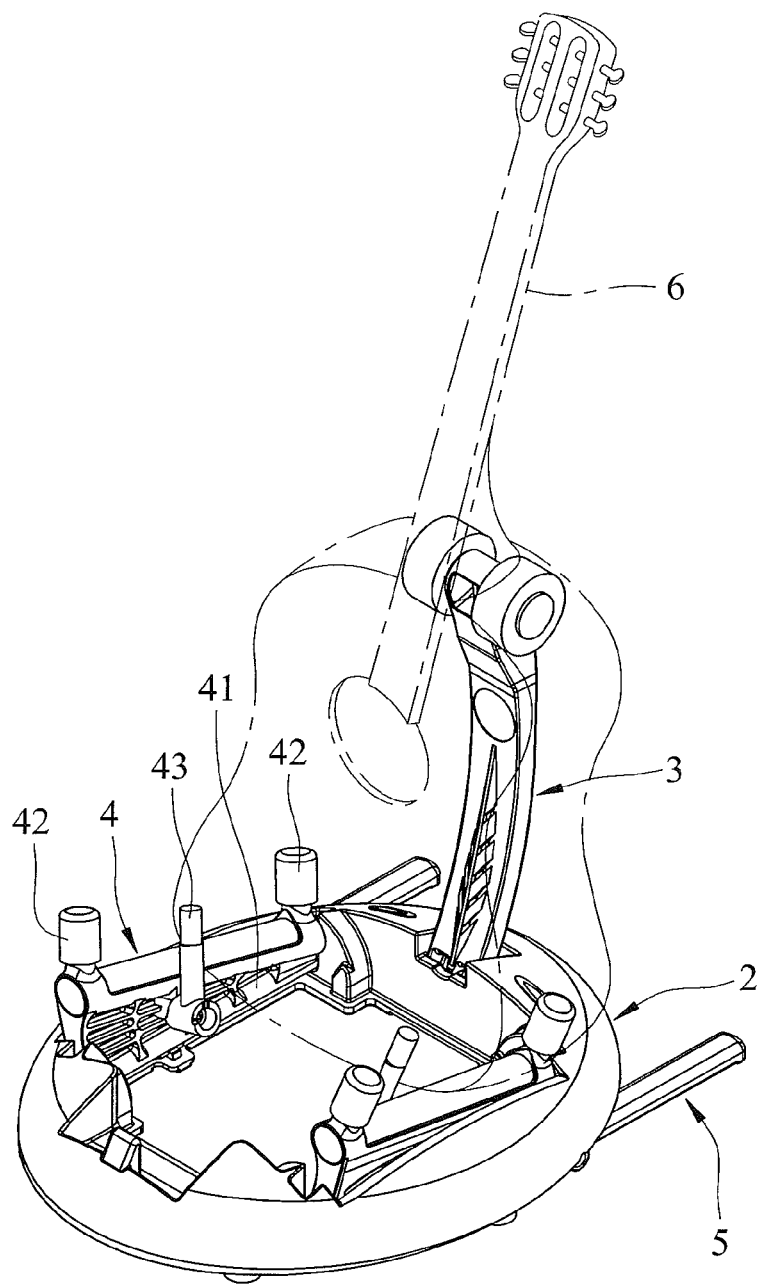
FIG. 12 is a schematic operational view of the musical instrument stand as shown in FIG. 1.
Figure 13:
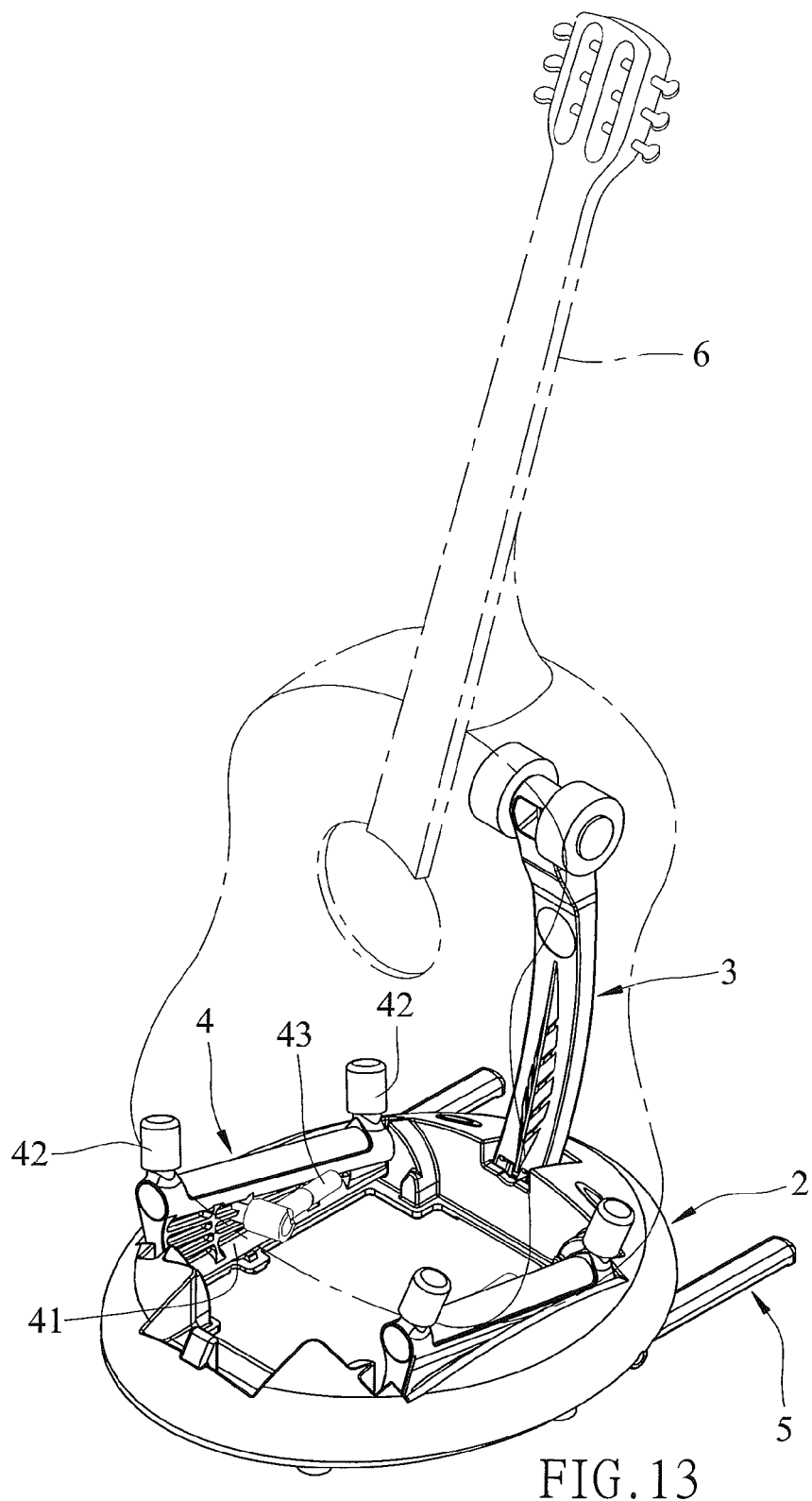
FIG. 13 is another schematic operational view of the musical instrument stand as shown in FIG. 1.

Referring to FIGS. 12 and 13, the rotary block 43 of each of the support units 4 is pivotally connected with the pivot rod 41 and is arranged between the fixing blocks 42. The rotary block 43 of each of the support units 4 is pivoted relative to the pivot rod 41 and is positioned between a first position as shown in FIG. 12 where the rotary block 43 of each of the support units 4 extends in a direction the same as that of each of the fixing blocks 42, and a second position as shown in FIG. 13 where the rotary block 43 of each of the support units 4 extends in a direction the same as that of the pivot rod 41.

Figure 3:
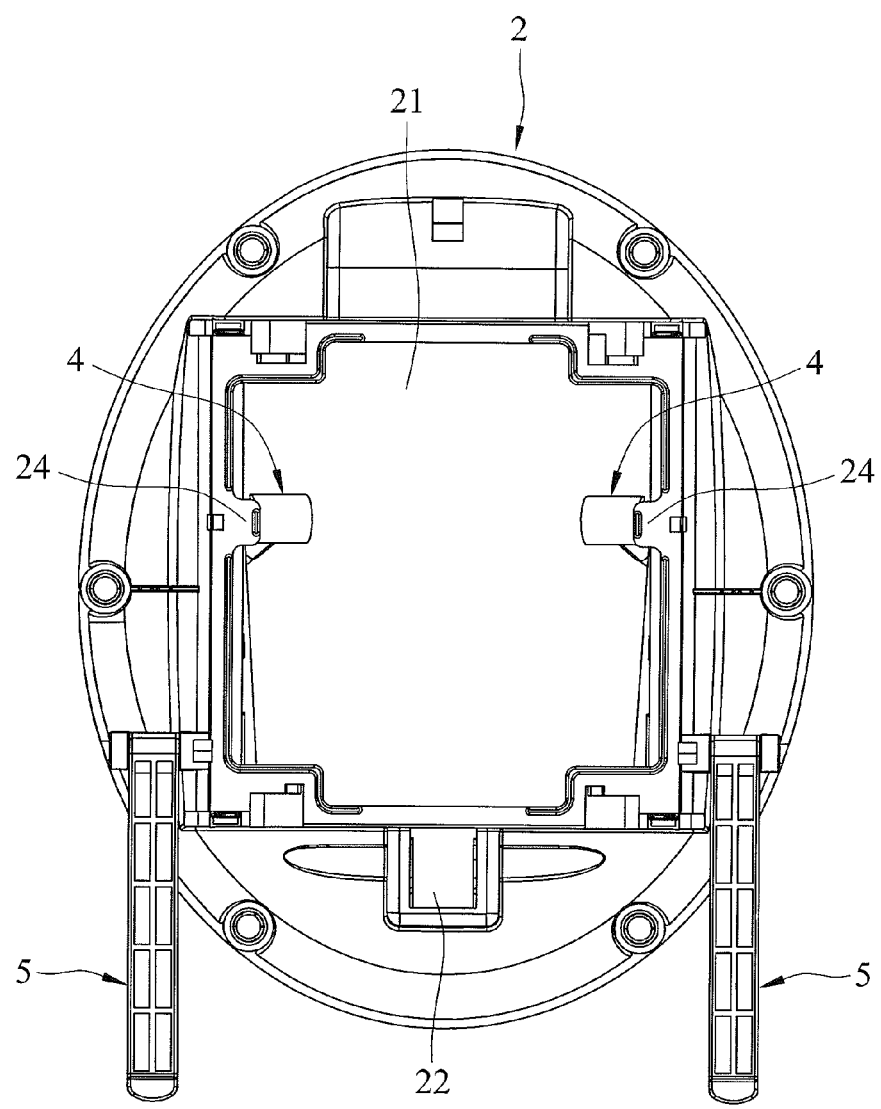
FIG. 3 is a bottom view of the musical instrument stand as shown in FIG. 1.
Figure 14:
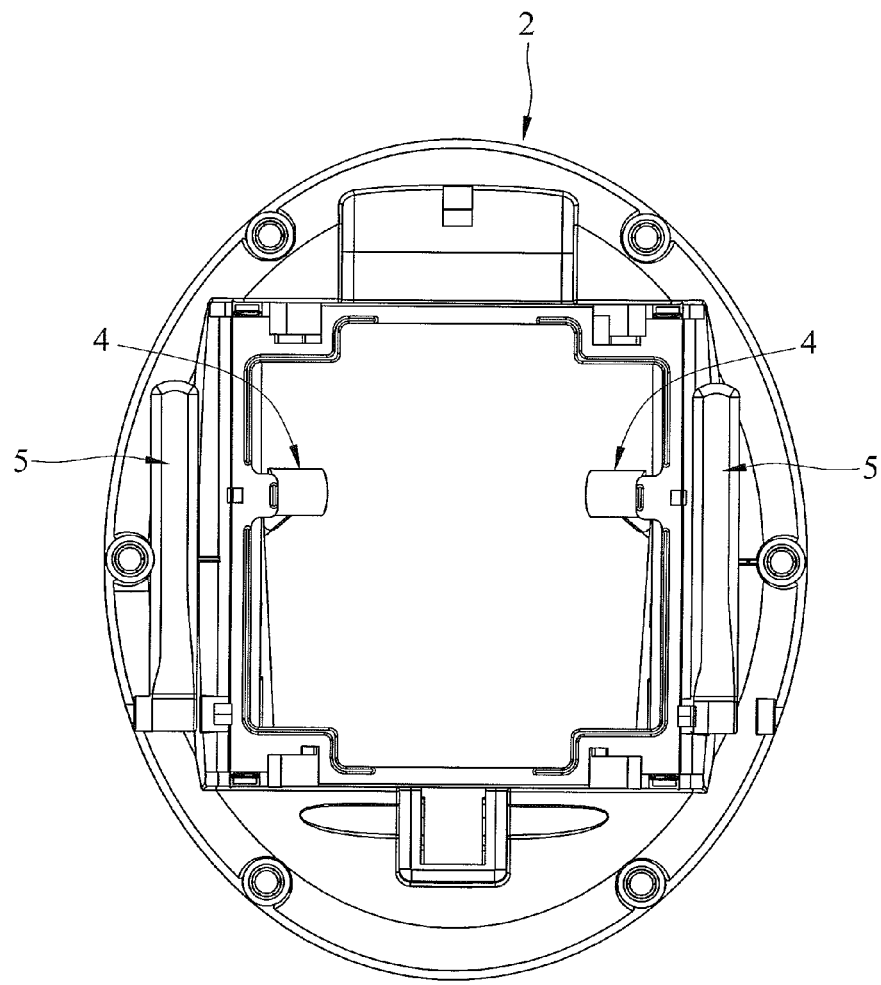
FIG. 14 is a schematic operational view of the musical instrument stand as shown in FIG. 3.

Referring to FIGS. 1 and 3, each of the supporting bars 5 is pivotally mounted on the bottom of the base 2 and extends toward the rear side of the base 2 as shown in FIG. 3 so that the base 2 is supported by the supporting bars 5 and placed on a plane. In addition, each of the supporting bars 5 is pivoted relative to the base 2 and folded in the base 2 as shown in FIG. 14.

Referring to FIG. 7, in the preferred embodiment of the present invention, the bottom of the base 2 is formed with two protruding retaining blocks 25 (only one of the retaining blocks 25 is shown) corresponding to the supporting bars 5 respectively, and each of the supporting bars 5 is formed with a retaining groove 51 corresponding to one of the retaining blocks 25. Thus, when each of the supporting bars 5 is pivoted to abut the base 2, the retaining groove 51 of each of the supporting bars 5 is locked onto one of the retaining blocks 25 of the base 2, so that each of the supporting bars 5 is positioned on the bottom of the base 2.

Alternatively, the retaining blocks 25 are formed on the supporting bars 5, and the retaining grooves 51 are formed in the bottom of the base 2.

Referring to FIG. 12, the resting member 3 is pivoted and positioned at the upright state, each of the support units 4 is pivoted outward to the expanded position, and the rotary block 43 of each of the support units 4 is rotated to extend in the direction the same as that of each of the fixing blocks 42, so that when the musical instrument 6 with a smaller volume is placed on the musical instrument stand, the bottom of the musical instrument 6 is clamped between the rotary blocks 43 and the fixing blocks 42, and the back of the musical instrument 6 rests on the resting member 3.

Referring to FIG. 13, the rotary block 43 of each of the support units 4 is rotated to extend in the direction the same as that of the pivot rod 41, so that each of the support units 4 has a larger space. Thus, when the musical instrument 6 with a larger volume is placed on the musical instrument stand, the bottom of the musical instrument 6 is clamped between the fixing blocks 42 of each of the support units 4.

When the musical instrument stand is in use, each of the supporting bars 5 extends and protrudes outward from the rear side of the base 2 so that the base 2 is supported by the supporting bars 5 solidly and stably, thereby preventing the musical instrument 6 and the musical instrument stand from falling down.

Referring to FIGS. 8, 10 and 14, when the musical instrument stand is not in use, the resting member 3 is pivoted downward and positioned on the base 2, each of the support units 4 is pivoted inward to the folded position, and each of the supporting bars 5 is pivoted inward and positioned on the bottom of the base 2, so that the volume of the musical instrument stand is reduced largely, thereby facilitating the user storing the musical instrument stand.

Accordingly, the musical instrument stand can place, protect and exhibit the musical instruments 6 of different sizes. In addition, the volume of the musical instrument stand is reduced largely, thereby facilitating the user storing the musical instrument stand. Further, most of the parts of the musical instrument stand are connected pivotally, so that the user only needs to rotate the parts of the musical instrument stand so as to use or fold the musical instrument stand conveniently in an energy-saving manner.

Therefore, the musical instrument stand in accordance with the present invention has the following advantages.

In the first advantage, when the locking ends 411 of the pivot rod 41 of each of the support units 4 press the elastic strips 231 of one of the elastic units 23, the pivot rod 41 of each of the support units 4 is retained on the base 2 by the elastic restoring action of the elastic strips 231 of one of the elastic units 23, so that each of the support units 4 is positioned on the base 2. Thus, the musical instrument stand is assembled quickly and operated easily and conveniently In the second advantage, when the pivot end portion 31 of the resting member 3 is pivoted, the positioning protrusion 311 of the pivot end portion 31 of the resting member 3 presses the elastic positioning plate 22, and is positioned in the positioning groove 222 by the elastic restoring action of the elastic positioning plate 22, so that the resting member 3 is positioned at the upright expanded state. Thus, the resting member 3 is pivoted smoothly and is positioned exactly and precisely.

In the third advantage, when the slide 412 slides in the slideway 242 of one of the elastic pieces 24 of the base 2, the slide 412 of the pivot rod 41 of each of the support units 4 is pressed by the elastic restoring action of one of the elastic pieces 24 and is positioned in the folding recess 243, the mediate recess 244 and the expanding recess 245 of the slideway 242 of one of the elastic pieces 24, so that each of the support units 4 is positioned on the base 2 exactly and closely.

In the fourth advantage, when the slide 412 of the pivot rod 41 of each of the support units 4 is positioned in the folding recess 243, the mediate recess 244 and the expanding recess 245 of the slideway 242 of one of the elastic pieces 24, the fixing blocks 42 of each of the support units 4 are disposed at different inclined angles and can co-operate with the rotary block 43 to place the musical instruments 6 of different shapes and sizes.

In the fifth advantage, when each of the supporting bars 5 is pivoted to abut the base 2, the retaining groove 51 of each of the supporting bars 5 is locked onto one of the retaining blocks 25 of the base 2, so that each of the supporting bars 5 is positioned on the bottom of the base 2 exactly and will not be easily pivoted outward from the base 2 due to a gravity action, thereby facilitating the user carrying or moving the musical instrument stand.

In conclusion, each of the support units 4 is easily positioned on the base 2 by provision of the elastic strips 231, so that the musical instrument stand is assembled quickly and operated easily and conveniently. In addition, the musical instrument stand is manufactured easily and quickly with a lower cost of fabrication. Further, the elastic positioning plate 22 provides an elastic restoring force to the resting member 3 so that the resting member 3 is pivoted relative to the base 2 smoothly and is positioned on the base 2 exactly. Further, each of the elastic pieces 24 provides an elastic restoring force to each of the support units 4 so that each of the support units 4 is pivoted relative to the base 2 smoothly and is positioned on the base 2 exactly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A musical instrument stand comprising:
a base, a resting member, and two support units;
wherein:
the base defines a central hole;
the base includes two elastic units provided on two opposite sides of the central hole, and two slideways corresponding to the elastic units respectively;
each of the slideways has a wall formed with a folding recess and an expanding recess, and the expanding recess is disposed between the central hole and the folding recess;
each of the elastic units includes two spaced elastic strips;
the resting member has a pivot end portion pivotally connected with the base and located adjacent to a rear side of the central hole, and has a free end that is spaced from and rotatable upward and downward relative to the pivot end portion;
the support units are pivotally connected with the base and correspond to the elastic units respectively;
each of the support units includes a pivot rod;
the pivot rod of each of the support units has two opposite locking ends and a slide;
the locking ends of the pivot rod of each of the support units respectively press the elastic strips of one of the elastic units, and the pivot rod of each of the support units is retained on the base by an elastic restoring action of the elastic strips of one of the elastic units; and
the slide of the pivot rod of each of the support units slides reciprocally in one of the slideways of the base and is detachably positioned in the folding recess and the expanding recess of one of the slideways, and each of the support units is moved relative to the base and is positioned at a folded position and an expanded position.

2. The musical instrument stand of claim 1, wherein:
the base further includes two elastic pieces each having a free end;
each of the elastic pieces protrudes and extends toward the central hole;
each of the slideways is formed in each of the elastic pieces; and
the slide of the pivot rod of each of the support units presses one of the elastic pieces when sliding in one of the slideways and is limited in the folding recess or the expanding recess of one of the slideways by an elastic restoring action of one of the elastic pieces.

3. The musical instrument stand of claim 1, wherein:
the wall of each of the slideways is further formed with a mediate recess disposed between the expanding recess and the folding recess;
the slide of each of the support units is detachably positioned in the mediate recess of one of the slideways; and
each of the support units is positioned at an intermediate position between the folded position and the expanded position.

4. The musical instrument stand of claim 1, wherein:
each of the support units further includes two spaced fixing blocks mounted on the pivot rod;
each of the fixing blocks of each of the support units extends in a direction the same as that of the pivot rod and extends radially and outward; and
when each of the support units is respectively located at the folded position and the expanded position, each of the fixing blocks of each of the support units 4 is respectively inclined and directed toward the central hole, and is inclined and spaced from the central hole.

5. The musical instrument stand of claim 4, wherein:
each of the support units further includes a rotary block pivotally connected with the pivot rod and is arranged between the fixing blocks; and
the rotary block of each of the support units is pivoted relative to the pivot rod and is positioned between a first position where the rotary block of each of the support units extends in a direction the same as that of each of the fixing blocks, and a second position where the rotary block of each of the support units extends in a direction the same as that of the pivot rod.

6. The musical instrument stand of claim 1, wherein:
the musical instrument stand further comprises two supporting bars pivotally mounted on a bottom of the base and extending toward a rear side of the base so that the base is supported by the supporting bars and placed on a plane; and
each of the supporting bars is pivoted relative to the base and folded in the base.

7. The musical instrument stand of claim 6, wherein:
the bottom of the base is formed with two protruding retaining blocks;
each of the supporting bars is formed with a retaining groove corresponding to one of the retaining blocks; and
when each of the supporting bars is pivoted to abut the base, the retaining groove of each of the supporting bars is locked onto one of the retaining blocks of the base.

8. The musical instrument stand of claim 1, wherein:
the base further includes a positioning groove corresponding to the pivot end portion of the resting member; and
the pivot end portion of the resting member has a positioning protrusion detachably positioned in the positioning groove, so that the resting member extends upward and is positioned at an upright state.

9. The musical instrument stand of claim 8, wherein:
the base further includes an elastic positioning plate corresponding to the resting member and having a free end;
the positioning groove is formed in the elastic positioning plate; and
the positioning protrusion of the resting member presses the elastic positioning plate and is positioned in the positioning groove by an elastic restoring action of the elastic positioning plate.

\* \* \* \* \*